Patented May 5, 1931

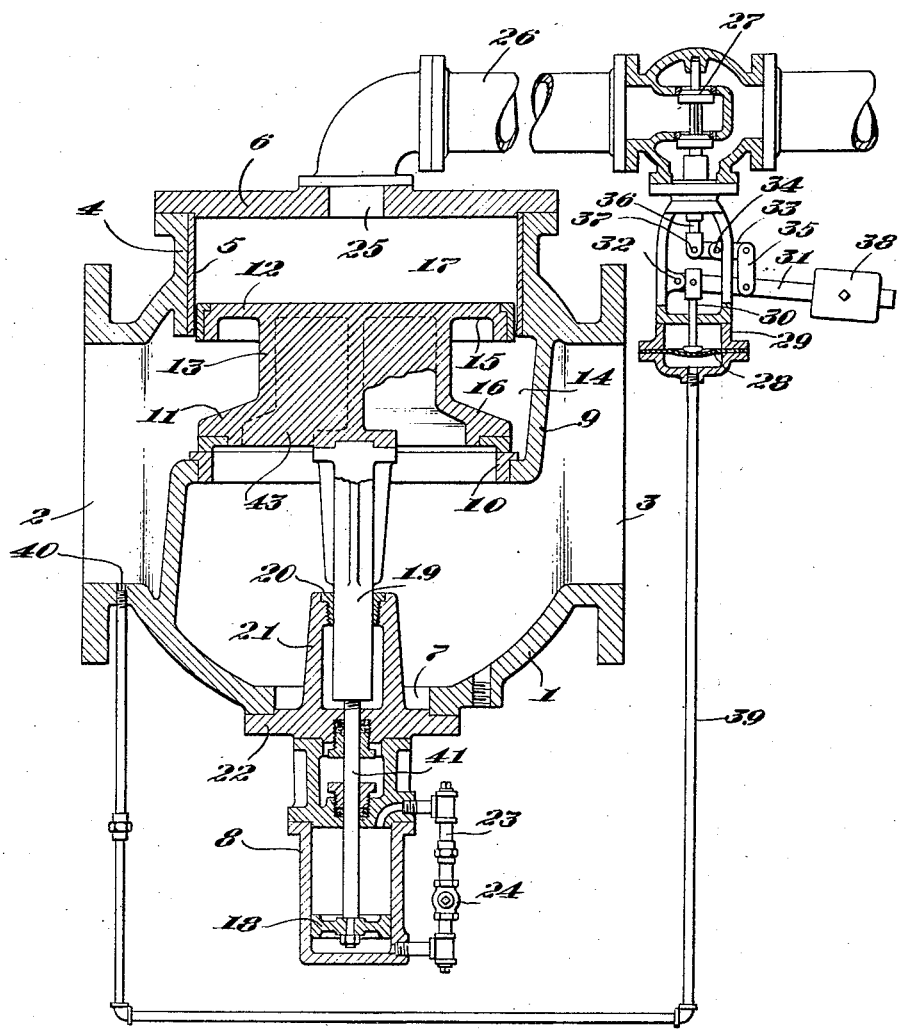

1,804,060

UNITED STATES PATENT OFFICE

HERBERT B. MORRILL, OF SALEM, MASSACHUSETTS, ASSIGNOR TO ATWOOD & MORRILL CO., OF SALEM, MASSACHUSETTS, A CORPORATION OF MASSACHUSETTS

SAFETY RELIEF VALVE

Application filed December 17, 1928. Serial No. 326,695.

Objects of the present invention are to provide a relief valve which can be accurately adjusted to relieve a pressure system when a predetermined maximum pressure is attained, which is positive and reliable in action, which opens quickly to afford prompt relief, which opens widely to discharge large volumes as required for example in relieving turbine process extraction lines to the atmosphere in case of failure of the pressure controller on the turbine, which overcomes the leakage difficulties common in valves of the double-seated type, which is steady in operation and free from hammer-blow action, which can be repaired without removing the valve casing from its line of piping, which is economical in construction and easy to install or repair, and which is generally superior to relief valves heretofore constructed.

For the purpose of illustrating the genus of the invention a preferred species is shown in the accompanying drawing which is a central longitudinal section showing parts in elevation.

The particular embodiment of the invention chosen for the purpose of illustration comprises a casing 1 having an inlet port 2, and outlet port 3, a cylindrical wall 4 constituting a cylinder which has a lining 5 and is closed at the top by a cap 6, an opening 7 at the bottom to receive the dash-pot assembly 8 and a partition 9 having a valve seat 10 in a plane approximately parallel with the axis of the aligned openings 2 and 3, the valve seat being coaxial with the cylinder 4 and opening 7. Associated with the valve seat 10 and the cylinder 4 is a combined valve and piston member comprising a valve portion 11 seating on the valve seat 10 and a piston portion 12 reciprocating in the cylinder 4, the two portions being integrally interconnected by means of a tubular portion 13 adjacent the peripheries of the portions 11 and 12 and a spider portion 43. The diameter of the piston 12 is somewhat greater than the diameter of the valve 11 so that the pressure in compartment 14 exerts a greater upward pressure on the marginal face 15 of the piston than it does on the marginal face 16 of the valve, thereby tending to lift the piston-valve member in the absence of a counteracting pressure in cylinder chamber 17. However, the construction is such that the fluid in compartment 14 leaks into the chamber 17, either between the piston and cylinder as shown in the drawings or otherwise, thereby normally holding the valve on its seat.

The piston 18 of the dash-pot 8 is connected to the piston-valve unit through connections comprising stem 19 fast to spider 43 and sliding in a bearing 20 in an interior extension 21 of the cap 22 for opening 7 and a rod 41 fast in the lower end of stem 19. The dash-pot 8 is provided with a by-pass 23 of usual construction containing a valve 24 which may be arranged to retard the piston 18 equally in both directions or more in one direction than the other. Connected to the opening 25 in a cap 6 is a discharge line 26 containing a reciprocating pilot valve 27 which is actuated by diaphragm 28 in chamber 29, the diaphragm being connected to the valve through stem 30 pivoted to lever 31 which in turn is pivoted to the casing 29 at 32, a link 33 pivoted to the casing at 34 and pivotally interconnected with the lever 31 by a link 35 and pivotally interconnected with the valve stem 36 at 37. The lever 31 carries an adjustable weight 38 to vary the pressure at which the diaphragm 28 will open the pilot valve 27. The space in casing 29 below the diaphragm 28 is connected through piping 39 to the inlet side of the valve casing as shown at 40 so that the diaphragm is subjected to the maximum pressure existing in the pressure system connected to the inlet side of the valve casing, although the diaphragm prevents any escape of pressure fluid through the pipe 39.

In operation the weight 38 normally closes the pilot valve 27 so that the fluid leaking past the piston 12 from the inlet 2 builds up a pressure in chamber 17 which overcomes the differential of pressure on piston face 15 over that on valve face 16, thereby closing the valve. The dash-pot serves to retard the closing movement and prevents the valve from striking the valve seat with a destructive blow. When the pressure on the inlet side 2 builds up to the predetermined maximum determined by the adjustment of weight 38 the diaphragm 28 moves upwardly thereby opening the pilot valve 27. This permits the pressure in chamber 17 to escape and the aforesaid pressure differential thereupon opens the valve. When the pressure has dropped below the predetermined maximum the diaphragm 28 permits the weight 38 again to close the pilot valve 27, whereupon pressure again builds up in chamber 17 to close the main valve.

From the foregoing it will be evident that inasmuch as the valve 11 and piston 12 are integrally interconnected by the tubular wall 13 remotely from the axis of the member, the valve and piston unit has great rigidity so that the valve and piston portions will never get out of alignment to cause binding or leakage as would be the case if the valve and piston were formed separately and merely interconnected at the center by a rod or stem. Moreover the tubular wall 13 reduces the area of the marginal portions 15 and 16 so that the upward pressure on the piston and the downward pressure on the valve are reduced in magnitude. It will also be evident that the piston-valve and dash-pot may be disassembled by removing the caps 6 and 22 without disconnecting the inlet 2 and outlet 3 from the main pipe line.

I claim:

1. A relief valve assemblage comprising a casing having an inlet for attachment to a pressure system and an outlet for discharge from the system, a relief valve in the casing between said inlet and outlet, a differential-pressure actuator for said valve, the actuator being adapted to be exposed to pressure on one side to open the valve and on the other side to a chamber having restricted leakage connection with said system, a pilot valve connected on one side to said chamber and on the other side to a discharge outlet, pressure responsive means for opening the pilot valve in response to increase of pressure in the system on the inlet side of the main valve including a connection between said means and said system, leakage from the system to said chamber closing the main valve when the pilot valve is closed and the release of pressure in the chamber when the pilot valve is open permitting pressure on the first side of said actuator to open the relief valve, said means including a diaphragm interconnected with the pilot valve through mechanism comprising a lever carrying an adjustable weight.

2. A relief valve assemblage comprising a casing having an inlet for attachment to a pressure system and an outlet for discharge from the system, a relief valve in the casing between said inlet and outlet, a differential-pressure actuator for said valve, the actuator being adapted to be exposed to pressure on one side to open the valve and on the other side to a chamber having restricted leakage connection with said system, a pilot valve connected on one side to said chamber and on the other side to a discharge outlet, pressure responsive means for opening the pilot valve in response to increase of pressure in the system on the inlet side of the main valve including a connection between said means and said system, leakage from the system to said chamber closing the main valve when the pilot valve is closed and the release of pressure in the chamber when the pilot valve is opened permitting pressure on the first side of said actuator to open the relief valve, said actuator comprising a piston coaxial with the relief valve and reciprocating in a cylindrical portion of the casing, the casing having a third opening for inserting the relief valve and piston and a fourth opening in alignment with the valve and piston, and a dash-pot for the valve and piston mounted in the fourth opening.

Signed by me at Boston, Massachusetts, this 30th day of November, 1928.

HERBERT B. MORRILL.